United States Patent [19]

Kakehi et al.

[11] 4,440,093

[45] Apr. 3, 1984

[54] VEHICLE TILT CONTROL APPARATUS

[75] Inventors: Yutaka Kakehi; Katsuyuki Terada; Kenjiro Kasai; Fumio Iwasaki, all of Kudamatsu, Japan

[73] Assignee: Hitachi, Ltd., Tokyo, Japan

[21] Appl. No.: 276,477

[22] Filed: Jun. 23, 1981

[30] Foreign Application Priority Data

Jun. 23, 1980 [JP] Japan .................................. 55-84010
Jul. 23, 1980 [JP] Japan ........................... 55-103236[U]

[51] Int. Cl.³ ......................... B61B 12/02; B61F 5/16; B61F 5/24
[52] U.S. Cl. .................................... 105/164; 105/171; 105/201; 105/199 A; 280/110; 280/112 A
[58] Field of Search .................... 105/164, 199 A, 171, 105/201; 280/112 A, 110; 248/550

[56] References Cited

U.S. PATENT DOCUMENTS

| | | | |
|---|---|---|---|
| 3,606,233 | 9/1971 | Scharton et al. | 248/550 |
| 3,688,703 | 9/1972 | Pollinger | 280/112 A X |
| 3,688,704 | 9/1972 | Strohmer et al. | 280/112 A X |
| 3,902,691 | 9/1975 | Ott | 105/199 A |
| 3,977,694 | 8/1976 | Nordstrom | 105/164 |
| 4,069,767 | 1/1978 | Glaze | 105/164 |
| 4,267,736 | 5/1981 | Westbeck | 105/164 X |

OTHER PUBLICATIONS

Modern Dictionary of Electronics; Graf, Rudolff; 5th Edition, 1977; pp. 19, 303, 392, 421, 522, 525 and 526; Howard W. Sams & Co. Inc.
Standard Handbook for Electrical Engineers; Tenth Edition, 1968, p. 28-24, Editors, Fink, Donald G. and Carroll, John M.; McGraw-Hill Book Company.

*Primary Examiner*—Robert B. Reeves
*Assistant Examiner*—Howard Beltran
*Attorney, Agent, or Firm*—Antonelli, Terry & Wands

[57] ABSTRACT

A vehicle tilt control apparatus has an acceleration detector for detecting vibration in horizontal and lateral direction of a car body, a fluidically operating mechanism disposed between the car body and a truck and compensation circuits for compensating a centrifugal force component and a jolting component, respectively, of the output of the acceleration detector. The outputs of the compensation circuits are added and the resulting output is fed back to actuate a servo valve to control the fluidically operating mechanism. In this manner, the riding comfort to the passengers when the vehicle passes through a curved area and for the jolting is improved.

9 Claims, 11 Drawing Figures

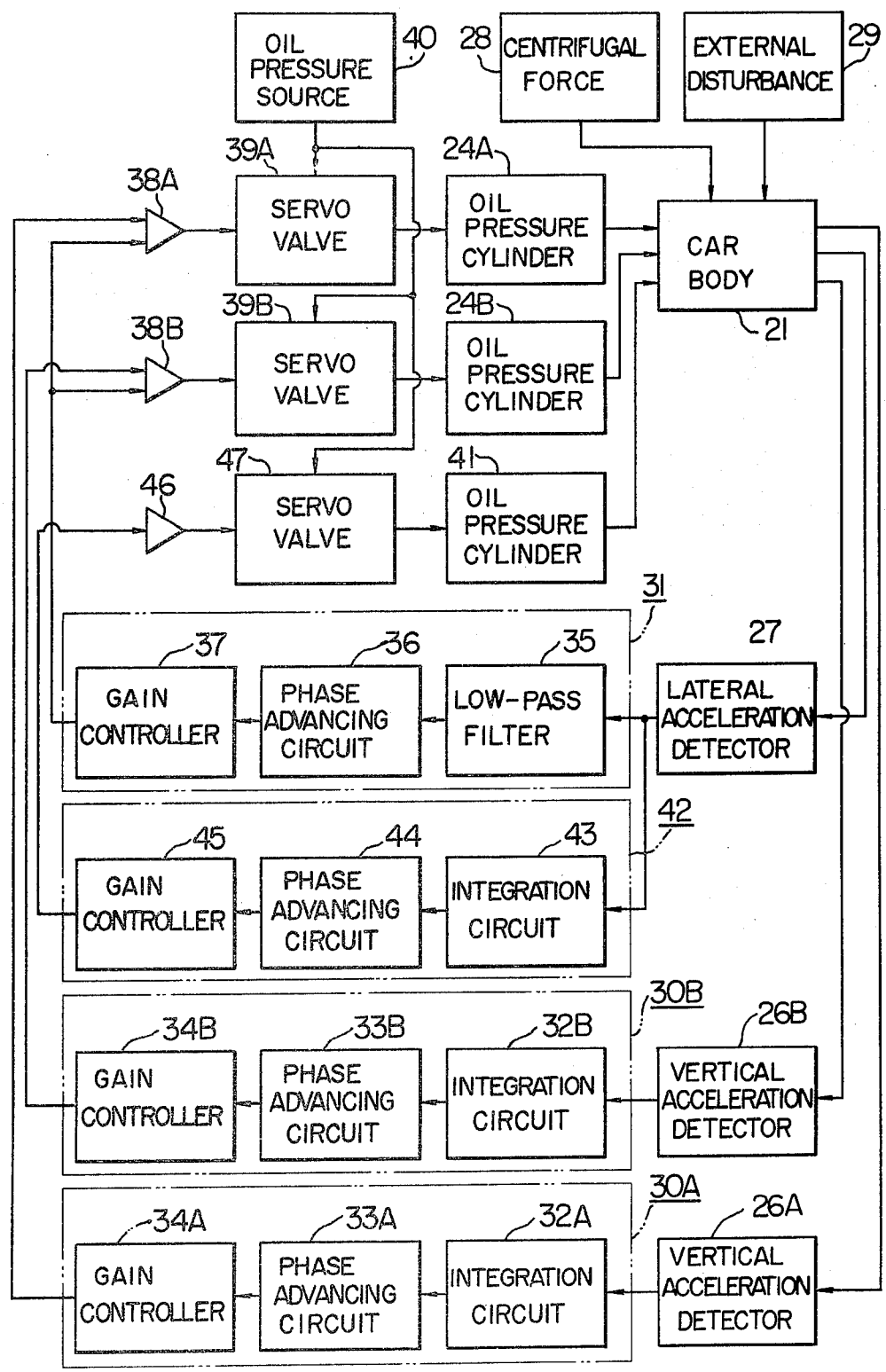

VEHICLE TILT CONTROL APPARATUS

The present invention related to a vehicle tilting apparatus and a control apparatus for suppressing vibration, and more particularly to a vehicle tilt control apparatus which assures comfortable riding to passengers when a vehicle passes through straight and curved area.

Figure 1:
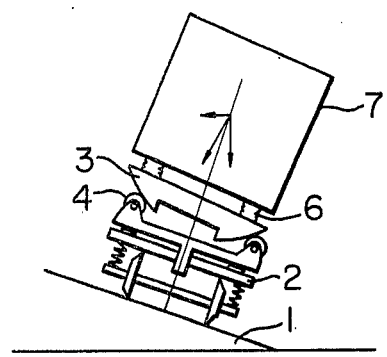

Present days, in order to prevent bad riding comfort to the passengers due to a centrifugal force when the vehicle passes through the curved area and enable high speed travel. A pendulumly suspended car has been put into practical use. FIG. 1 shows a structure thereof, in which a car body 7 is tilted inward in order to cancel out a lateral acceleration due to an excessive centrifugal force which is not absorbed by a cant of a track. The pendulumly suspended car is designed such that a rotation center of the car body 7 is positioned above a center of gravity so that the car body 7 naturally tilts on rollers 4. In FIG. 1, numeral 2 denotes a truck and numeral 3 denotes a support which rolls on the rollers 4 and supports the car body 7 through air spring 6. In the prior art pendulumly suspended car constructed as shown, even if the car enters a transient curve the car body 7 does not tilt due to a friction of the roller 4 until the friction is overcome but it tilts suddenly when the friction is overcome. As a result, the passengers feel bad riding comfort. In addition, because of jolting-back action by the air spring 6, the car body 7 can not be tilted to a geometrically required position. Furthermore, the friction of the rollers 4 adversely affects the jolting in the straight and curved areas, which gives bad riding comfort to the passengers due to the vibration, so called jolting. On the other hand, in a tilt controlled vehicle which has a fluidically operating mechanism such as an oil pressure cylinder between the car body and the truck and a lateral acceleration of the car body is detected and controlled, a good riding comfort is presented to the passengers for the centrifugal force in the curved area but the bad riding comfort due to the vibration or the jolting is not improved. This has been a serious problem as the track condition tends to become worse and worse.

A vehicle which actively controls the vibration has been recently being developed. However, since such a vibration control apparatus uses a control circuit to reduce a vibration acceleration to the jolting, it can not fully control the tilt of the car body.

Accordingly, an object of the present invention is to eliminate the above-mentioned disadvantages of the conventional vehicle tilt control apparatus.

According to one aspect of the present invention there is provided a vehicle tilt control apparatus for tiltably supporting a car body on a truck comprising;

a fluidically operating mechanism disposed between said car body and said truck for tilting said car body relative to said truck, a control valve arranged in correspondence to said fluidically operating mechanism for controlling the operation of said fluidically operating mechanism, an acceleration detector mounted on said car body for detecting an acceleration of said car body, a centrifugal force compensation circuit connected to said acceleration detector for compensating a centrifugal force component of an output of said acceleration detector, a jolting compensation circuit connected to said acceleration detector for compensating a jolting component of the output of said acceleration detector, and a control circuit connected to said centrifugal force compensation circuit and said jolting compensation circuit for adding the outputs of said compensation circuits and feeding back the resulting output to produce a control signal for actuating said fluidically operating mechanism through said control valve to tilt said car body.

Figure 2:
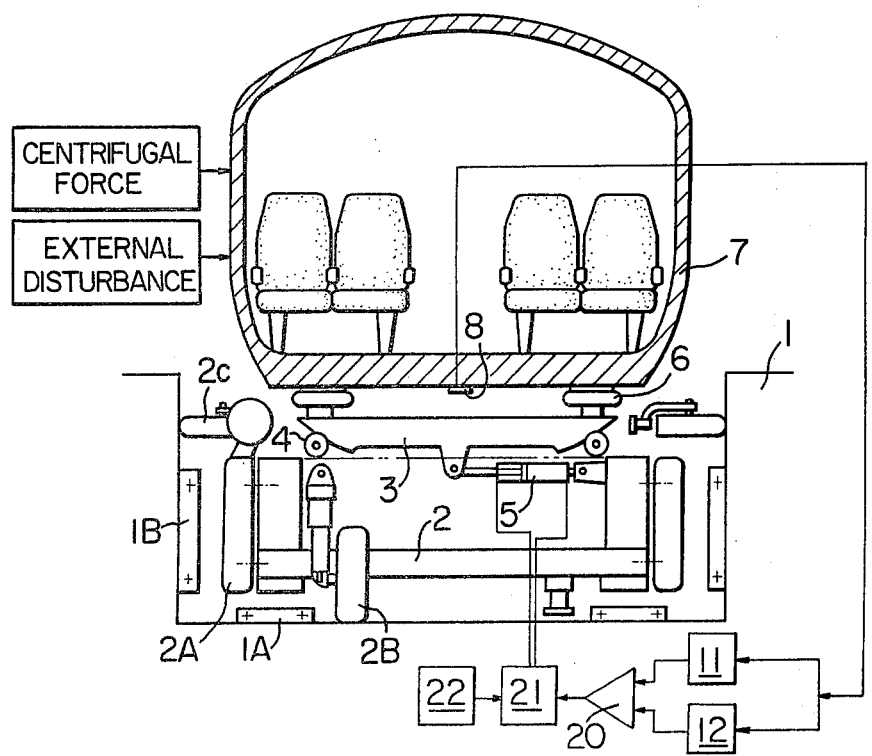
Figure 3:
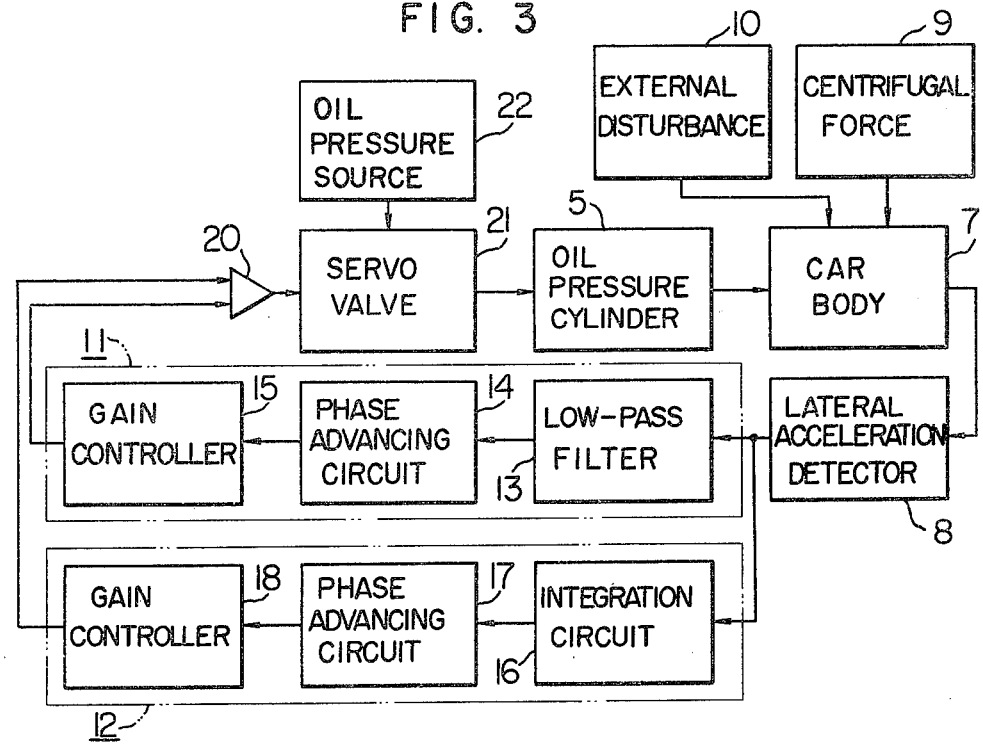
Figure 4:
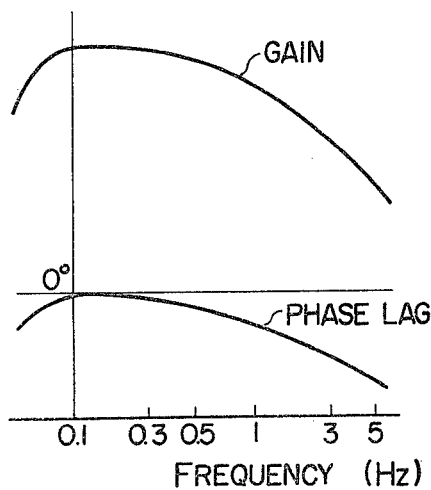
Figure 5:
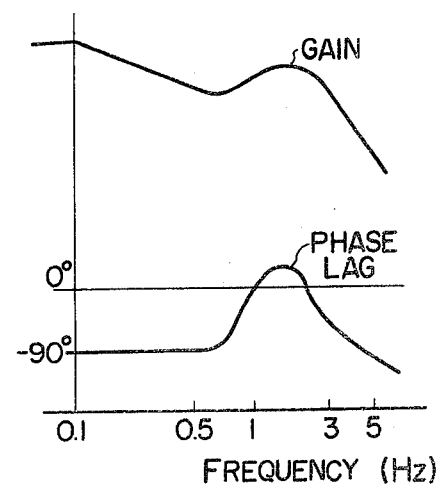
Figure 6:
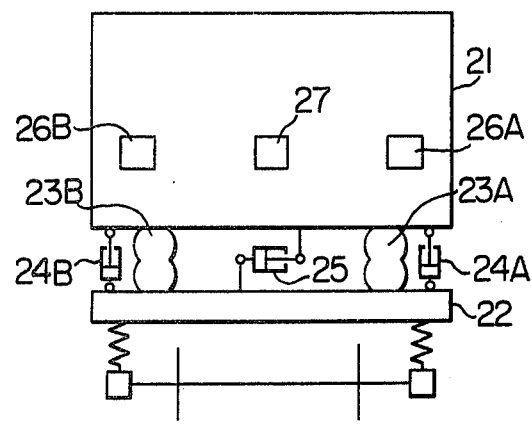
Figure 7:
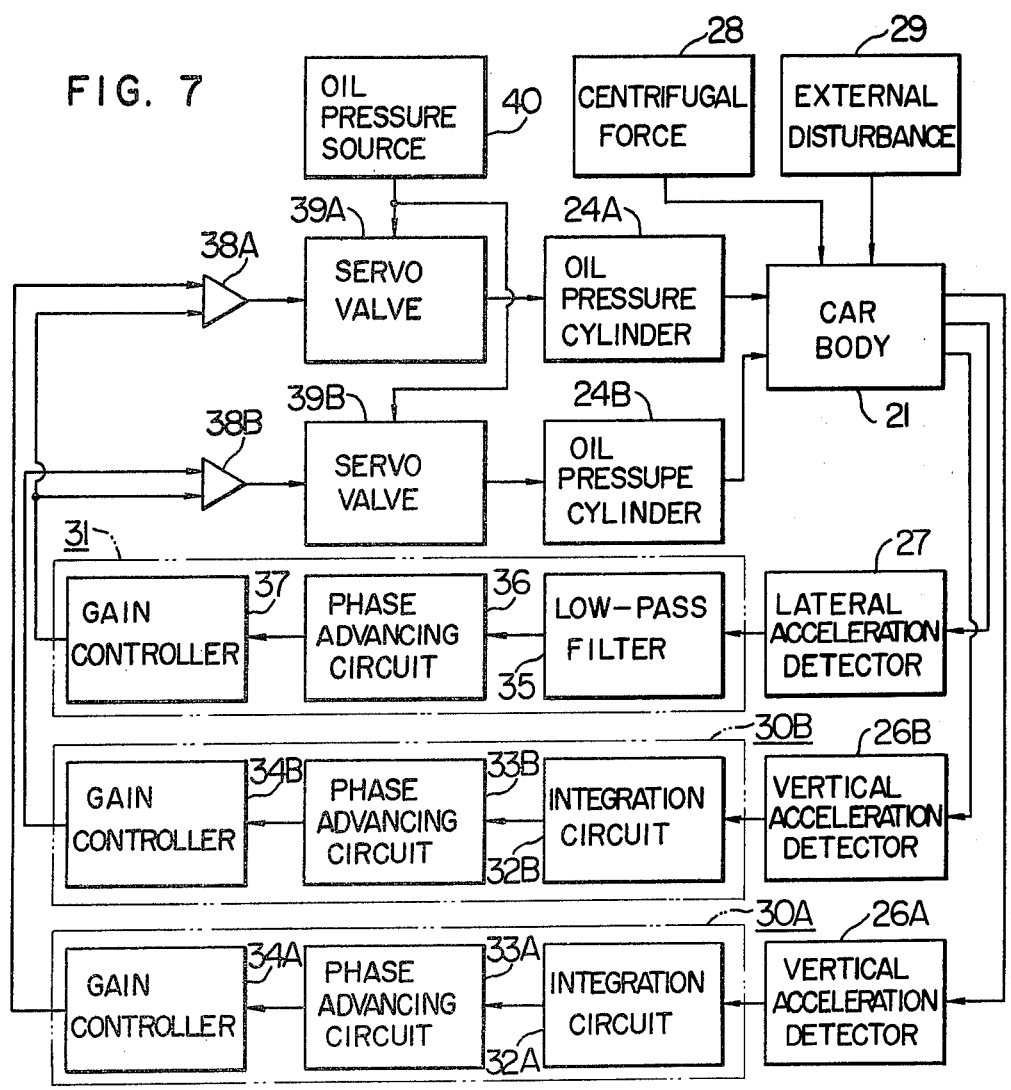
Figure 8:
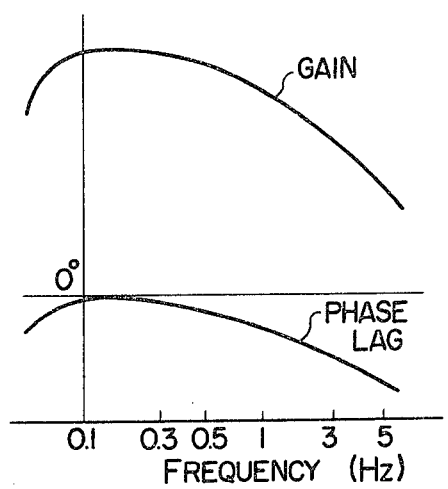
Figure 9:
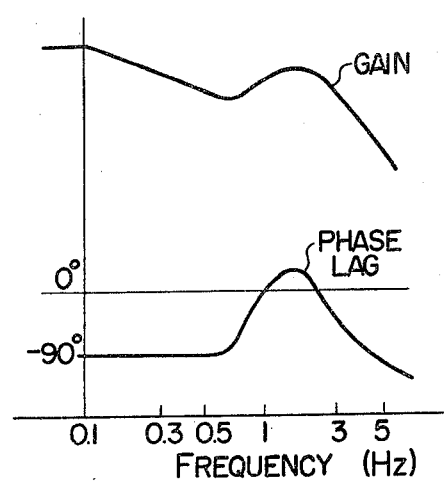
Figure 10:
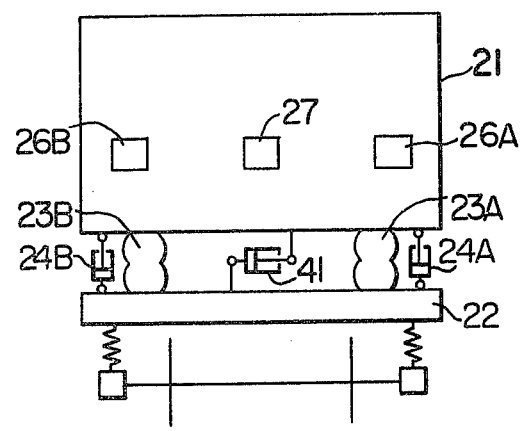

The above and other objects, features and advantages of the present invention will be more clear from the following description with reference to the accompanying drawings, in which:

FIG. 1 shows a lateral sectional view of a car body illustrating a prior art pendulumly suspended car, FIG. 2 shows partial lateral sectional view of a car body illustrating one embodiment which applies a tilt control apparatus of the present invention to a magnetically levitated vehicle, FIG. 3 shows a circuit diagram of the tilt control apparatus of FIG. 2, FIG. 4 shows a chart illustrating a frequency characteristic of a centrifugal force compensation circuit of the tilt control apparatus of FIG. 3, FIG. 5 shows a chart illustrating a frequency characteristic of a jolting compensation circuit of the tilt control apparatus of FIG. 3, FIG. 6 schematically shows a lateral sectional view of a car body illustrating an embodiment which applies the tilt control apparatus of the present invention to a bolsterless car, FIG. 7 shows a circuit diagram of the tilt control apparatus of FIG. 6, FIG. 8 shows a chart illustrating a frequency characteristic of a centrifugal force compensation circuit of the tilt control apparatus of FIG. 7, FIG. 9 shows a chart illustrating a frequency characteristic of a jolting compensation circuit of the tilt control circuit of FIG. 7, FIG. 10 schematically shows a lateral sectional view of a car body illustrating another embodiment which applies the tilt control apparatus of the present invention to a bolsterless car, and FIG. 11 shows a block diagram of the tilt control apparatus of FIG. 10.

The preferred embodiments of the present invention will now be explained with reference to FIGS. 2 to 11. FIGS. 2 and 3 show an embodiment in which the present invention is applied to a superconductive magnetically levitated vehicle. In FIG. 2, floating coils 1A and guide propelling coils 1B are arranged along a track 1. A truck 2 is provided with a cryostat 2A having a superconductive magnet disposed therein, a low speed wheel 2B and guide wheels 2C. Numeral 3 denotes a support for supporting a car body 7 through an air spring 6. The support 3 is mounted on rollers 4. Numeral 5 denotes an oil pressure cylinder which is a fluidically operating mechanism for coupling the support 3 and the truck 2. The car body 7 can be tilted by expanding or compressing the oil pressure cylinder 5. Numeral 8 denotes a lateral acceleration detector which is mounted on the car body 7 and detects lateral vibration of the car body 7. Referring to FIG. 3, a control apparatus is now explained. Numeral 9 denotes a centrifugal force applied to the car body 7 when the vehicle passes through a curved area, numeral 10 denotes an external disturbance from the track which causes jolting of the car body 7, and numeral 11 denotes a centrifugal compensation circuit to which one of branched outputs of the lateral acceleration detector 8 is applied. In the illustrated embodiment, it comprises a low-pass filter 13, a phase advancing circuit 14 and a gain controller 15. The other one of the branched outputs of the lateral acceleration detector 8 is applied to a jolting compensation circuit 12, which comprises, in the illustrated embodiment, an integration circuit 16, a phase advancing circuit 17 and a gain controller 18. Numeral 20 denotes a servo amplifier for adding and amplifying the outputs of the centrifugal force compensation circuit 11 and the jolting compensation circuit 12, numeral 21 denotes a servo valve which is a control valve for controlling the oil pressure cylinder 5 by the output of the servo amplifier 20, and numeral 22 denotes a pressured oil source for supplying pressured oil to the servo valve 21.

Referring to FIGS. 4 and 5, frequency characteristics of the centrifugal force compensation circuit 11 and the jolting compensation circuit 12 are explained. In the centrifugal force compensation circuit 11 shown in FIG. 3, the low-pass filter 13 picks up only the centrifugal acceleration in the curved area which is normally no larger than 0.3 Hz and 0.1 g at maximum (where g is a gravity acceleration) and the phase advancing circuit 14 compensates for a phase lag caused in the low-pass filter 13 and the gain controller 15 matches a gain of the circuit to a gain of the jolting compensation circuit 12 before the output of the circuit is applied to the servo amplifier 20. The centrifugal acceleration is related to a tilt angle of the car body as shown in FIG. 1. Since it may be regarded that the vibration system comprising the air spring 6 and the car body 7 has a substantially flat frequency characteristic to the tilt of the car body of no larger than 0.3 Hz, the illustrated compensation circuit can sufficiently control the tilt. On the other hand, the jolting compensation circuit 12 handles natural frequencies of jolting ranging between 0.8 Hz and 2 Hz. It is therefore designed to retard the phase by approximately 90 degrees and attenuate gain by 20 dB/dC by the integration circuit 16 for the frequency components of lower than 1 Hz, amplify the gain and advance the phase by 0-30 degrees for the frequency components of higher than 1 Hz and abruptly attenuate the gain for high frequency components. In the present embodiment, it is a primary object to control yawing (that is, a vibration mode in which back and front portions of the car body vibrate horizontally and oppositely to each other) of the jolting of the car body. Accordingly, the phase advancing circuit 17 is matched to the natural frequency of the yawing which is around 1.5 Hz and the integration characteristic by the integration circuit 16 is dominant for the low frequencies mentioned above. Such an integration characteristic is presented in order to keep an amplitude response (lateral acceleration of the car body/exciting horizontal acceleration by the track irregularity) below unity for the low frequency components in the track irregularity. For the low frequency components the phase would be advanced too much by an acceleration feedback and hence a velocity feedback is used. By the friction of the rollers and the lateral rigidity of the air spring, the vibration displacement tends to be always kept at a neutral position (that is, a displacement feedback). While the present embodiment is primarily intended to control the yawing, it is also effective to control roll (that is, a rotational vibration around a longitudinal axis of the car body).

The present embodiment thus constructed operates in the following manner as the vehicle passes through the curved area. A lateral acceleration of the car body by the centrifugal force applied to the car body usually comprises low frequency components of no larger than 0.3 Hz throughout an entrance relaxation curve, a circle curve and an exit relaxation curve. Accordingly, the centrifugal acceleration detected by the lateral acceleration detector 8 is transmitted to both the centrifugal force compensation circuit 11 and the jolting compensation circuit 12. Since the gain controllers 15 and 18 are adjusted such that the gain of the centrifugal force compensation circuit 11 is much larger for those frequency components, the output of the centrifugal force compensation circuit 11 is primarily transmitted to the servo amplifier 20 and fed back with proper gain and phase so that the oil pressure cylinder 5 tilts the car body 7 in a manner to reduce the lateral acceleration of the car body caused by the centrifugal force. On the other hand, the lateral acceleration detector 8 also detects the vibration acceleration caused by the yawing and rolling of the car body 7 by the external disturbance 10 from the track 1. The natural frequencies of the vibrations under normal design are around 1.5 Hz for the yawing, around 0.8 Hz for the below-center rolling and around 1.6 Hz for the above-center rolling, and dominant jolting components of the car body 7 range between 0.5 Hz and 2 Hz. Since such jolting components are cut by the low-pass filter 13 in the centrifugal force compensation circuit 11, the output of the jolting compensation circuit 12 is primarily transmitted to the servo amplifier 20 and fed back with proper gain and phase so that the oil pressure cylinder 5 acts to further reduce the lateral acceleration of the car body caused by the jolting. It should be understood that the centrifugal force control and the vibration control are simultaneously effected in the curved area while only the vibration control is effected in the straight area.

The tilt control apparatus of the pendulumly suspended car of the structure described above can positively resolve the adverse affect by the friction of the rollers, which has been a problem in the prior art pendulumly suspended car, by using the oil pressure cylinder and only one control device except the compensation circuits are needed to control the centrifugal force, when the vehicle passes through the curved area, and the vibration or the joltings, when the vehicle passes through the curved or straight area, so that comfortable riding is presented to the passengers.

In the present embodiment, since the centrifugal force compensation circuit 11 is effective to the jolting components of no larger than 0.3 Hz, the vibration control capability reduces accordingly. Since the lateral acceleration of the car body for those frequency components of the jolting is no higher than 0.005 g, such an affect can be readily eliminated by providing a non-sensitive band for the acceleration of no higher than 0.005 g to the gain controller 14 of the centrifugal force compensation circuit 11.

FIGS. 6 and 7 show an embodiment in which the present invention is applied to a bolsterless car. FIG. 6 shows a front view and FIG. 7 shows a control block diagram for the vertical vibration, pitching and rolling of the car body. In FIG. 6, numeral 21 denotes the car body and numeral 22 denotes a truck. The car body 21 is supported by two air springs 23A and 23B, and oil pressure cylinders 24A and 24B, which are fluidically operating mechanisms, are arranged adjacent thereto.

Numeral 25 denotes an oil damper for damping lateral vibration. Numerals 26A, 26B and 27 denote vertical acceleration detectors and a lateral acceleration detector mounted on the car body 21. In FIG. 7, the like numerals to those shown in FIG. 6 denote the like elements. Numeral 28 denotes a centrifugal force applied to the car body 21 when the vehicle passes through a curved area, numeral 29 denotes external disturbance from the track which causes the jolting of the car body 21, and numerals 30A and 30B denote jolting compensation circuits which comprise, in the illustrated embodiment, integration circuits 32A and 32B, phase advancing circuits 33A and 33B and gain controllers 34A and 34B, respectively. Numeral 31 denotes a centrifugal force compensation circuit to which the output of the lateral acceleration detector 27 is applied. In the illustrated embodiment, it comprises a low-pass filter 35, a phase advancing circuit 36 and a gain controller 37. Numerals 38A and 38B denote servo amplifiers for adding and amplifying the outputs of the compensation circuits 30A and 30B, respectively, and the compensation circuit 31, numerals 39A and 39B denote servo valves for controlling the oil pressure cylinders 24A and 24B, respectively, and numeral 40 denotes an oil pressure source.

Referring to FIGS. 8 and 9, frequency characteristics of the centrifugal force compensation circuit 31 and the jolting compensation circuits 30A and 30B are explained. In the centrifugal force compensation circuit 31 shown in FIG. 8, the low-pass filter 35 picks up only the centrifugal acceleration in the curved area which is normally no larger than 0.3 Hz and 0.1 g at maximum (where g is a gravity acceleration), the phase advancing circuit 36 compensates for the phase retarded in the low-pass filter 35 and the gain controller 37 matches the gain of the circuit with the gains of the jolting compensation circuits 30A and 30B before the signals are supplied to the servo amplifiers 38A and 38B. With such frequency characteristics, the tilt control is effectively made like in the previous embodiment.

In the jolting compensation circuits 30A and 30B, the vertical vibration around 1.5 Hz is primarily handled and the natural frequency of other jolting which ranges between 0.8 Hz and 2 Hz is also handled. Like in the previous embodiment, the frequency components of lower than 1 Hz are retarded by approximately 90 degrees in the integration circuits 32A and 32B, the gain decreases at a rate of 20 dB/dC as the frequency rises, the gain is increased and the phase is advanced by 0 to 30 degrees for the frequency components of higher than 1 Hz and the gain abruptly decreases for high frequency components so that the comfortable vibration control is effected to the vibrations such as vertical vibration, pitching and rolling as is done by the yawing and rolling control in the previous embodiment.

The operation of the vehicle tilt control apparatus in accordance with the present invention is now explained. When the vehicle passes through the curved area, the lateral acceleration on the floor of the car body is detected by the lateral acceleration detector 27. Since it is normally a low frequency component of no higher than 0.3 Hz as described above, it passes through the low-pass filter 35 of the centrifugal force compensation circuit 31, the phase is advanced and the gain is controlled and the resulting output is applied to the servo amplifiers 38A and 38B. Since the vertical component of the centrifugal acceleration is small, it is not appreciably detected by the vertical acceleration detectors 26A, 26B and hence the outputs of the jolting compensation circuits 30A and 30B are low. Accordingly, the output of the centrifugal force compensation circuit 31 is primarily supplied to the servo amplifiers 38A and 38B and the outputs thereof are fed back with appropriate gains and phases so that the oil pressure cylinders 24A and 24B operate in opposite sense to each other to tilt the car body 21 to reduce the lateral acceleration on the floor of the car body caused by the centrifugal force. On the other hand, the apparatus operates in the following manner for the jolting of 0.5–2 Hz. Since the yawing and rolling components detected by the lateral acceleration detector 27 are cut by the low-pass filter 35 of the centrifugal force compensation circuit 31, they are not appreciably transmitted to the servo amplifiers 38A and 38B. The vertical vibration or the pitching components (of the same phase in 26A and 26B) and the rolling components (of the opposite phases in 26A and 26B) detected by the vertical acceleration detectors 26A and 26B are compensated in the jolting compensation circuits 30A and 30B, respectively, and then supplied to the servo amplifiers 38A and 38B, and the outputs thereof are fed back with appropriate gains and phases so that the oil pressure cylinders 24A and 24B operate in the same direction for the vertical vibration or the pitching components and in the opposite directions to each other for the rolling components proportionally to the magnitudes of the respective components to reduce the vibration acceleration caused by the joltings.

With the construction described above, the control apparatus comprising the lateral acceleration detector 27, the servo amplifiers 38A and 38B, the servo valves 39A and 39B and the oil pressure cylinders 24A and 24B can effect the vehicle tilt control done in the prior art apparatus, and the vibration control to the jolting such as vertical vibration, pitching and rolling can be effected by the addition of the vertical acceleration detectors 26A and 26B and the compensation circuits 30A and 30B to reduce the acceleration of the car body to be less than a half or a third of that of the prior art apparatus. Accordingly, an inexpensive vehicle which presents comfortable riding to the passengers for the centrifugal force in the curved area and jolting in the curved area and straight area.

In the present embodiment, since the centrifugal force compensation circuit 31 is also effective to the jolting components of no higher than 0.3 Hz, the vibration control capability is lowered accordingly. However, since the lateral acceleration of the car body for the jolting of those frequency components is no larger than 0.005 g, such effect can be readily eliminated by designing the gain controller 37 of the centrifugal force compensation circuit 31 such that it is insensitive to the acceleration of no larger than 0.005 g as is the case of the previous embodiment. While the present embodiment uses the oil pressure cylinders 24A and 24B as the fluidically operating mechanism, air cylinders may be used instead of the oil pressure cylinders. In this case, air servo valves are used as the control valves and an air pressure source is used instead of the oil pressure source.

Referring to FIGS. 10 and 11, another embodiment of the bolsterless car is explained. In those figures, the like numerals to those shown in the previous embodiment of the bolsterless car denote the like elements. Numeral 41 denotes an oil pressure cylinder as the fluidically operating mechanism which is arranged to move the horizontal and lateral directions of the car body 21 and it takes place of the oil damper in the previous embodiment. The output of the lateral acceleration detector 27 of the car body 21 is supplied to the centrifugal force compensation circuit 31 as is done in the previous embodiment and also supplied to a lateral jolting compensation circuit 42 which controls a lateral oil pressure cylinder 41 through a servo amplifier 46 and a servo valve 47. Like the vertical jolting compensation circuit, the lateral jolting compensation circuit 42 comprises an integration circuit 43, a phase advancing circuit 44 and a gain controller 45 and has a frequency characteristic which causes the advancement of phase around the natural frequency of 1.5 Hz of the yawing, as shown in FIG. 5. The gain controllers 45 and 37 are designed such that the output of the gain controller 37 is much larger than the output of the gain controller 45 for the centrifugal acceleration detected by the lateral acceleration detector 27 as is the case of the previous embodiment shown in FIG. 3. As a result, the tilt control in the curved area is effectively made as is done in the embodiment of FIG. 7 and the joltings including the vertical vibration, pitching and rolling as well as yawing can be effectively controlled.

With the construction described above, since the lateral acceleration detector 27 is used to control both the centrifugal force and the vibration of the lateral jolting of the car body, an economic vehicle which presents comfortable riding to the passengers for the centrifugal force in the curved area and the jolting including the yawing can be provided.

In the present embodiment, the horizontal oil pressure cylinder 41 is used to control the vibration or the jolting. By supplying the output of the centrifugal force compensation circuit 31 to the horizontal servo amplifier 46 through the gain controller so that the horizontal oil pressure cylinder 41 is effective to the centrifugal force control, more effective control can be attained.

As described hereinabove, the present invention provides a vehicle tilt control apparatus which presents comfortable riding to the passenger in the curved area and for the vibration caused by jolting not only curved area but also straight area.

What is claimed is:

1. A vehicle tilt control apparatus provided between a car body and a truck for tiltably supporting the car body on the truck, comprising:
   a fluidically operating mechanism disposed between said car body and said truck for controlling the degree of tilting of said car body relative to said truck;
   an acceleration detector mounted on said car body for detecting centrifugal and vibration acceleration forces to which said car body is subjected and for producing an output indicative of the level of the forces detected;
   a centrifugal force compensation circuit connected to said acceleration detector and producing a control signal for suppressing centrifugal acceleration forces acting on said car body due to the passage of the car body through a curve, in response to a centrifugal force component of the output of said acceleration detector;
   a jolting compensation circuit connected to said acceleration detector and producing a control signal for suppressing vibration forces acting on the car body due to jolting of the car body, in response to a vibration component of the output of said acceleration detector;
   an adder circuit means, connected to said centrifugal force compensation circuit and said jolting compensation circuit, for adding the outputs of said compensation circuits and producing an output control signal; and
   a control valve arranged between said fluidically operating mechanism and a fluid source for controlling the flow of fluid between said fluid source and said fluidically operating mechanism in direct response to the output control signal of said adder circuit.

2. A vehicle tilt control apparatus according to claim 1 wherein said centrifugal force compensation circuit comprises a low-pass filter, a phase advancing circuit and a gain controller, and said jolting compensation circuit comprises an integration circuit, a phase advancing circuit and a gain controller.

3. A vehicle tilt control apparatus according to claim 2 wherein said gain controller of said centrifugal force compensation circuit has a non-sensitive band.

4. A vehicle tilt control apparatus according to claim 1 wherein said acceleration detector comprises a lateral acceleration detector for detecting lateral acceleration of the car body, said centrifugal force compensation circuit and said jolting compensation circuit being connected to said lateral acceleration detector.

5. A vehicle tilt control apparatus according to claim 4 wherein said car body is supported on a support through an elastic support device, said support tiltably supports said car body on said truck through rollers and said fluidically operating mechanism is disposed between said support and said truck.

6. A vehicle tilt control apparatus according to claim 1 wherein said acceleration detector comprises a lateral acceleration detector mounted on said car body for detecting lateral acceleration of said car body and a vertical acceleration detector for detecting vertical acceleration of said car body, said centrifugal force compensation circuit being connected to said lateral acceleration detector, said jolting compensation circuit being connected to said vertical acceleration detector, said fluidically operating mechanism being arranged to be actuable vertically of said car body.

7. A vehicle tilt control apparatus according to claim 6 wherein two elastic support devices and two said fluidically operating mechanisms are arranged between said car body and said truck, each of said fluidically operating mechanisms being controlled by separate said vertical acceleration detector, said jolting compensation circuit, said control circuit and said control valve, and the output of said centrifugal force compensation circuit which receives the output of said lateral acceleration detector is added to each of said control circuits.

8. A vehicle tilt control apparatus according to claim 7 wherein a horizontally and fluidically operating mechanism is arranged between said car body and said truck, and a jolting compensation circuit, a control circuit and a control valve for controlling said horizontally and fluidically operating mechanism are provided, said jolting compensation circuit for controlling said horizontally and fluidically operating mechanism being connected to said lateral acceleration detector.

9. A vehicle tilt control apparatus according to claim 8 further comprising a gain controller for transmitting the output of said centrifugal force compensation circuit to said horizontal control circuit.

* * * * *